United States Patent [19]

Baker

[11] Patent Number: 5,050,536
[45] Date of Patent: Sep. 24, 1991

[54] PLAYHOUSE FOR CATS

[76] Inventor: Reginald D. Baker, Whale Rock Pt., Narragansett, R.I. 02882

[21] Appl. No.: 510,514

[22] Filed: Apr. 18, 1990

[51] Int. Cl.$^5$ .............................................. A01K 1/00
[52] U.S. Cl. ....................................... 119/15; 119/19; 119/29; 217/13; 220/7
[58] Field of Search ........................ 119/1, 15, 19, 29; 217/12 R, 12 A, 13, 16; 220/6, 7; 272/113

[56] References Cited

U.S. PATENT DOCUMENTS

| | | | |
|---|---|---|---|
| 4,177,761 | 12/1979 | Bellocchi | 119/29 |
| 4,301,766 | 11/1981 | Piccone | 119/29 |
| 4,347,807 | 9/1982 | Reich | 119/29 |

Primary Examiner—John G. Weiss
Attorney, Agent, or Firm—Salter & Michaelson

[57] ABSTRACT

A playhouse for cats including a housing having panels that are formed in a one-piece construction and that are movable relative to each other to a closed collapsed position, whereby the housing is conveniently stored or shipped, a plurality of interior deck members being located within the housing to define a plurality of spaced interior compartments, openings being formed in the vertical panels which communicate with the interior compartments to provide access thereto for a cat, and a locking construction for retaining the vertical panels in the open erected position and that includes locking flap assemblies that are joined to the vertical panels at the uppermost ends thereof and that are foldable to a locked position to define horizontal upper perimeter rampart segments for securing the vertical panels in a stable erected position. At least two of the vertical panels are formed with fold lines that are located medially thereof and that extend in a vertical direction, the vertical fold lines providing for the collapsing of the panels in which they formed so as to dispose those panels in a collapsed, folded position when the housing is moved to the closed position thereof.

17 Claims, 4 Drawing Sheets

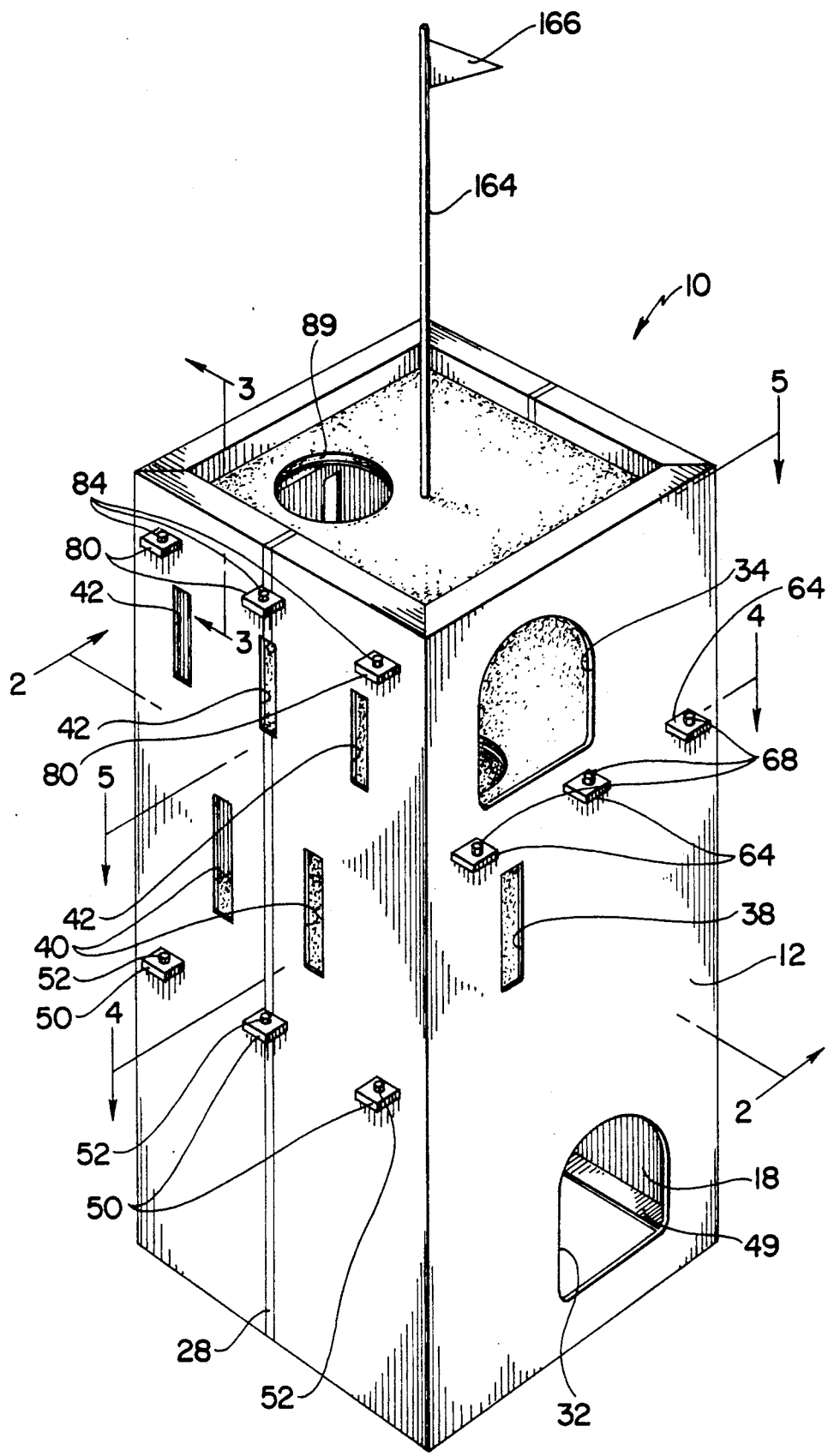
FIG. I

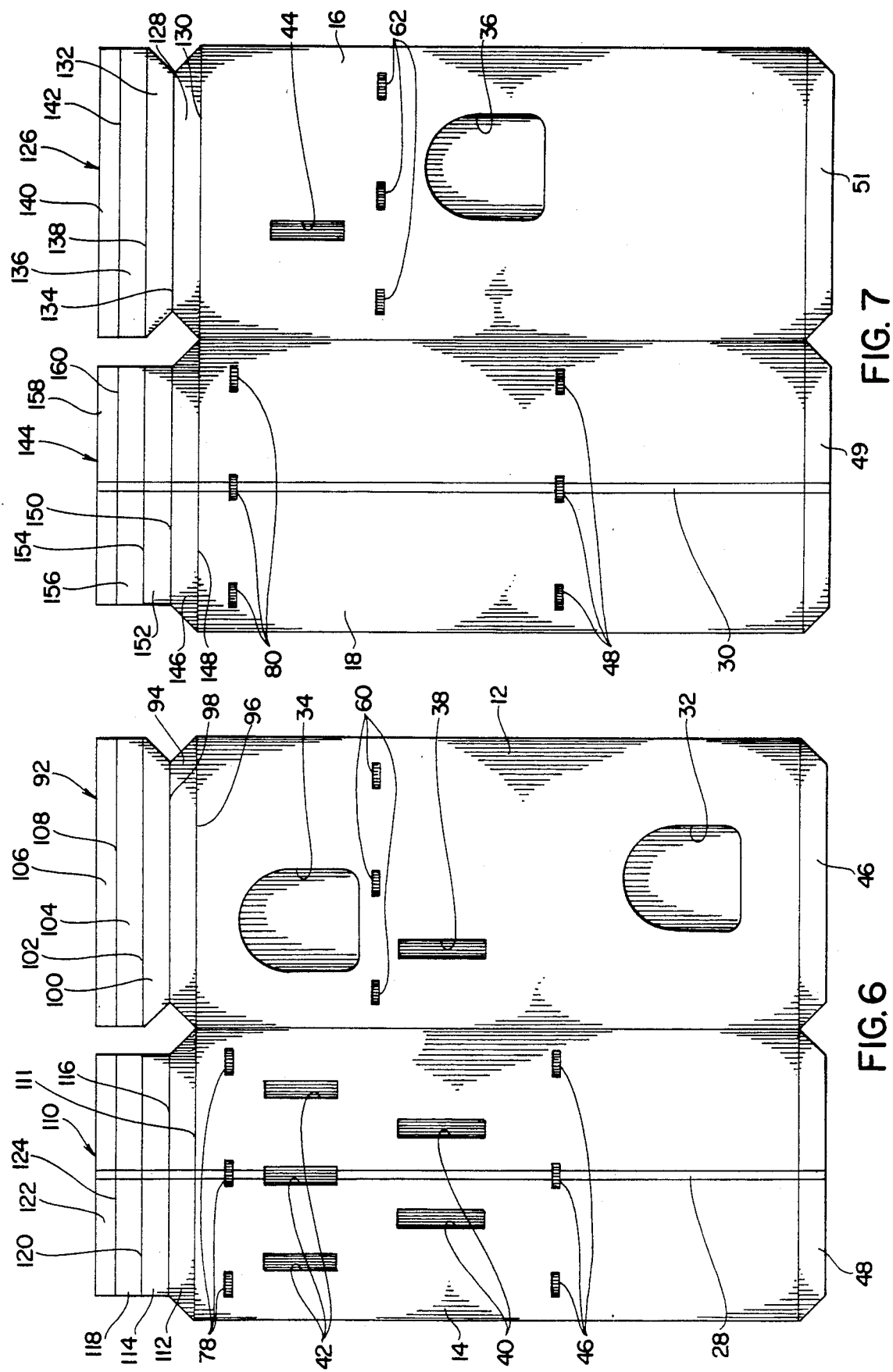

PLAYHOUSE FOR CATS

BACKGROUND OF THE INVENTION

The present invention relates to a playhouse for cats that is provided with multiple levels therein, the playhouse having panels that are moved from an erected position to a collapsed closed position for the shipping and storing thereof.

Prior to the instant invention, various kinds of devices have been utilized as pet playhouses, and in particular, because of the normal play activities of cats, some playhouses have been developed that included compartments having exterior openings that encouraged the natural curiosity of a cat to explore the various compartments of the playhouse construction. One such prior known construction is illustrated in the REICH, U.S. Pat. No. 4,347,807. The device as illustrated in this patent in its erected form includes a plurality of vertically spaced compartments, each of which has access to the exterior of the device through an opening as formed in one of the panels thereof. Although the REICH patent discloses the device as being erected from a collapsible position without the use of hinges or hardware, the method of manufacture and the construction thereof is somewhat complex and requires the securement of the panels of the construction to a work surface. Such construction is both costly and inefficient and further does not lead to a firmly erected unit that will withstand long-term play of a cat therein.

Another illustration of a device as used as a playhouse for cats is illustrated in the PICCONE, U.S. Pat. No. 4,301,766 which discloses a plurality of rectangular units in which circular openings are formed. The units may be randomly located and stacked to provide play interest for a cat, the openings in the units that make up the device including grooming means. Although the PICCONE device may have some application as a grooming device, the erection of the device through the placement of the rectangular units is somewhat complex in configuration and as a result is not economically feasible.

Other devices of which applicant is aware and which constitute the best prior art known to applicant and which also illustrate devices as used as playhouses for pets and particularly cats are shown in the BRENDON, U.S. Pat. No. 3,797,4651; QUINN, U.S. Pat. No. 3,872,832; HOLLAND et al, U.S. Pat. No. 4,391,223; BLAKERT, U.S. Pat. No. 4,576,116; and, GARNSEY, U.S. Pat. No. 4,603,658. None of these latter listed patents are particularly relevant with respect to the unique construction of applicant's playhouse.

As will be described hereinafter, applicant's playhouse is uniquely constructed so as to provide a relatively inexpensive device that is erected to a positive stable play position and that includes a plurality of compartments and openings that are naturally attractive to the curiosity of a cat.

SUMMARY OF THE INVENTION

The present invention relates to a playhouse for cats comprising a housing having a plurality of vertical panels that are formed in a one-piece construction and that are movable relative to each other to a closed collapsed position, whereby the housing is conveniently stored or shipped. A plurality of interior horizontal deck members are located within the housing and are disposed in vertically spaced relation to define a plurality of spaced interior compartments. Locking flap assemblies are joined to the vertical panels at the uppermost ends thereof and are foldable to a locked position to define horizontal upper perimeter rampart segments which cooperate to secure the vertical panels in a stable erected upright position. The deck members include an upper member that forms the top of the housing, the top deck member cooperating with the flap assemblies to secure the vertical panels in the erect position. A plurality of beam members are also provided for supporting the deck members within the housing, the beam members extending through slots as formed in the vertical panels and being exposed exteriorly thereof to provide an interesting and ornamental effect. The deck members are also supported in a firm position for defining a relatively rigid structure for the movement of a cat thereon as the cat moves from one deck member to another through access openings as formed in the deck members.

Accordingly, it is an object of the present invention to provide a collapsible playhouse for cats having vertical panels that are formed in a one-piece construction and that are movable to a closed collapsed position and that are located in an erected open position to define an upright housing and that are maintained in the open position by a plurality of locking flap assemblies that cooperate with an upper deck member of the playhouse and with support beams that extend through the panels thereof to locate the playhouse in a stable erected position thereof.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of the playhouse for cats as embodied in the present invention;

FIG. 6 is an elevational view showing two of the panels of the playhouse in an open position;

FIG. 7 is an elevational view showing another two panels of the playhouse in the open position;

DESCRIPTION OF THE PREFERRED EMBODIMENT

Figure 4:
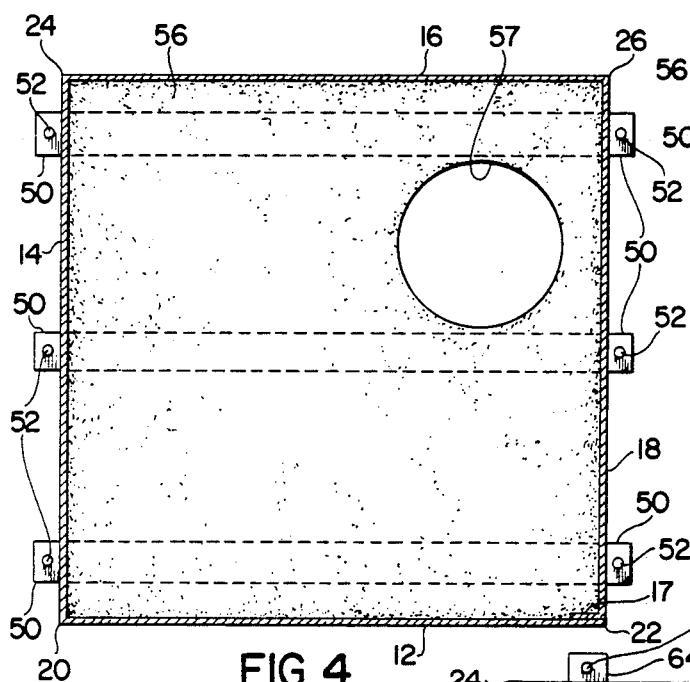
FIG. 4 is a horizontal sectional view taken along lines 4—4 in FIG. 1.
Figure 5:
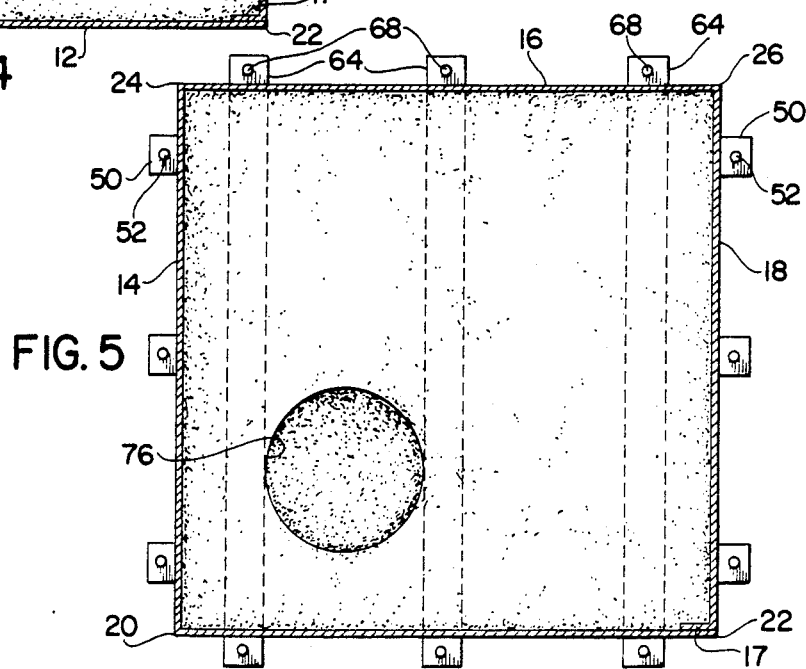
FIG. 5 is a horizontal sectional view taken along lines 5—5 in FIG. 1.

Referring now to FIG. 1, the playhouse for cats as embodied in the subject invention is illustrated and includes a housing generally indicated at 10. As shown in FIGS. 6 and 7, the housing 10 includes four vertical panels 12, 14, 16 and 18 that are interconnected together along fold lines, as will be described, and define a unitary one-piece construction. As shown in FIGS. 4 and 5, an interior flap 17 that is joined to the panel 18 is folded inwardly and is adhered to the adjacent interior surface of the panel 12 to locate the interconnected panels in a box-like configuration that defines the housing 10. Although the housing 10 as illustrated includes four panels, it is understood that the housing can also be constructed with six or eight panels.

Figure 8:
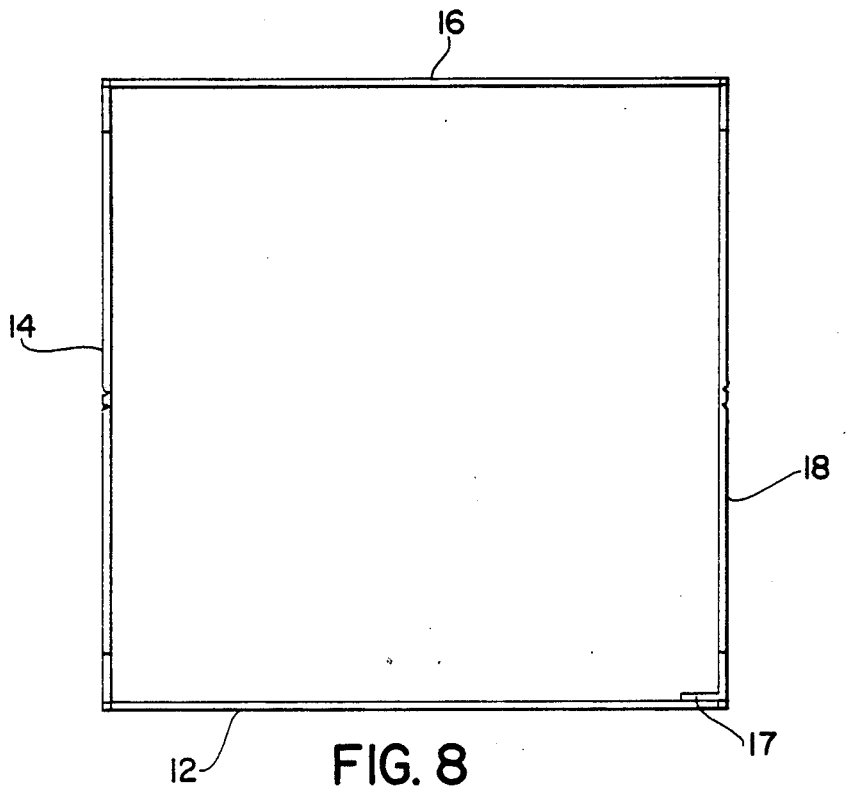
FIG. 8 is a top plan view showing the four panels of the playhouse as illustrated in FIG. 1 in the open erected position and prior to the collapsing thereof.
Figure 9:
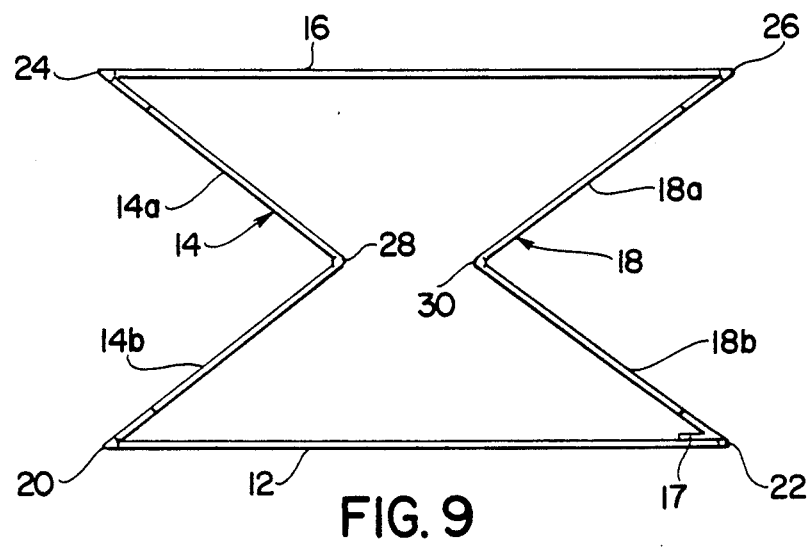
FIG. 9 is a top plan view showing the panels of the playhouse as they are moved to the folded collapsed position.
Figure 10:
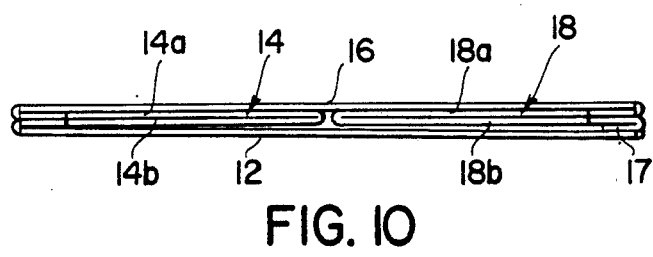
FIG. 10 is a top plan view showing the playhouse panels in the fully closed collapsed position for shipping or storing.

As illustrated in to FIG. 8-10, the panel 12 is shown connected to the panel 14 along a fold line 20 and is also joined to the panel 18 along a corresponding fold line 22 of the flap 17. Similarly, the panel 16 is joined to the panel 14 along a fold line 24 and is joined to the panel 18 along a fold line 26. As will be described in the collapsing of the playhouse to a closed position, the panels 14 and 18 are folded inwardly as shown in FIGS. 9 and 10, and for this purpose the panel 14 has a vertically medial fold line 28 formed therein that divides the panel 14 into sectional panels 14a and 14b. Similarly, the panel 18 is provided with a vertically extending medial fold line 30 that divides the panel 18 into sectional panels 18a and 18b.

For purposes of describing the construction and use of the playhouse, reference is now made to the playhouse as illustrated in the erected open position as shown in FIGS. 1-5. In order to provide exterior access to the interior of the housing 10, the panel 12 as shown in FIGS. 1 and 6 is formed with a lower opening 32 that communicates with a lower compartment as will be described, and is further formed with an upper opening 34 that communicates with an upper compartment. Exterior access is provided to a middle compartment by means of an opening 36 that is formed in the panel 16. The finished construction of the playhouse 10 has a medieval castle-like tower appearance, and in order to carry out this motif and to further add peep holes from the various compartments as formed within the housing for a cat playing in the playhouse, vertical slots are formed in some of the panels. As shown in FIG. 6 and 7, a vertical slot 38 is formed in the panel 12, while vertical slots 40 are formed in the panel 14 at the same level as the vertical slot 38. Additional vertical slots 42 are also formed in the panel 14 in the level above the slots 40 while a vertical slot 44 is formed in the panel 16 at the same level as the slots 42. Thus, the vertical slots 38, 40, 42 and 44 provide additional external visibility from the playhouse for the cat on the various levels in the housing as the cat moves from one level to another.

As further illustrated in FIGS. 6 and 7, the bottom of the panels 12 and 14 are formed with bottom flaps 46 and 48 respectively, these flaps being turned to a horizontal position during the movement of the housing panels to the open and upright position thereof. Correspondingly, the panels 16 and 18 are provided with bottom flaps 49 and 51 that cooperate with the bottom flaps 46 and 48 to define the base of the housing. When the housing is erected and the panels are located in the position as shown in FIGS. 1-5, a plurality of compartments are formed therein by inserting deck members at various levels within the housing. This is accomplished by mounting the deck members in place in an ascending order after the panels of the housing are moved to the fully open position, and for this purpose a plurality of support beams are fixed within the panels of the housing as now described. Referring first to FIGS. 6 and 7, a plurality of horizontal slots 46 are shown formed in the panel 14 while a corresponding series of slots 48 are formed in the oppositely located panel 18. As shown in FIG. 5, a plurality of spaced apart flat lower support beams 50 extend through the slots 46 and 48 and traverse the interior of the housing for extension outwardly of the slots 46 and 48 so as to be externally visible. Formed in each of the portions of the lower support beams 50 that extend outwardly of the panels 14 and 18 are small circular recesses into which upstanding pegs 52 are inserted for frictional securement therein. Thus, the lower support beams 50 are locked in the slots 46 and 48 against longitudinal withdrawal movement thereof. Mounted on the upper surfaces of the lower support beams 50 is a lower deck member 54 formed of any suitable material such as wood, paper or plastic, and having a geometric configuration that corresponds to that of the interior of the housing as defined by the erected panels 12, 14, 16 and 18. Overlying the upper surface of the lower deck member 54 and forming a part thereof is a square-shaped carpeting 56 that forms a soft surface for a cat playing thereon and that adds additional play appeal for the cat. With the lower deck member 54 in place, a lower compartment 58 is defined therebetween and the surface on which the bottom flaps 46, 48, 50 and 52 rest. Formed in the lower deck member 54 and the carpeting thereof is a circular opening 57 that provides communication between the lower compartment 58 and an intermediate compartment to be described.

Figure 2:
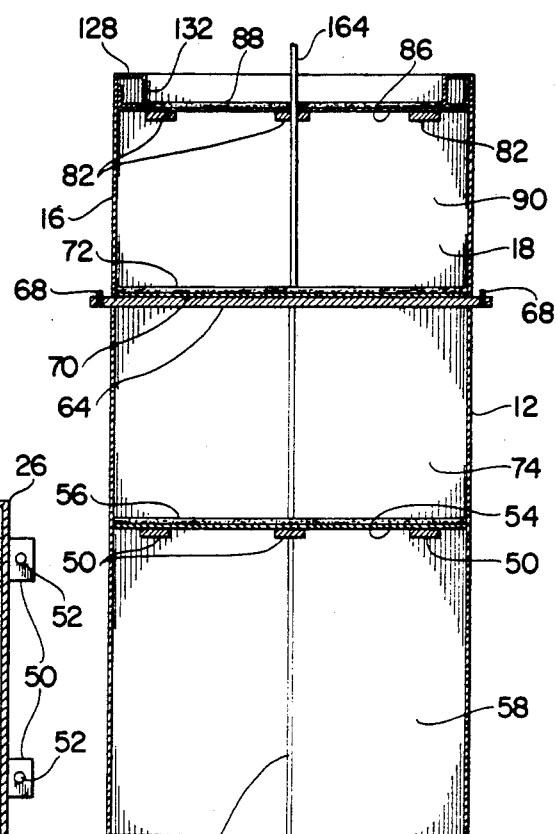
FIG. 2 is a vertical sectional view thereof as taken along lines 2—2 in FIG. 1.

Spaced vertically above the slots 46 and 48 and formed in the opposed panels 12 and 16 are horizontal slots 60 and 62, respectively. As illustrated in FIG. 6 a plurality of intermediate support beams 64 project through the slots 60 and 62 and extend across the interior of the housing in transverse relation with respect to the lower support beams 50 and project outwardly of the panels 12 and 16 for external visibility. Also formed in the exposed external portions of the intermediate support beams 64 are small circular recesses in which upstanding pegs 68 are received for locking the support beams 64 within the slots 60 and 62 against longitudinal withdrawal movement therefrom. As shown in FIG. 2, an intermediate deck member 70 is mounted on the intermediate support beams 64 and has a carpet overlay 72 formed as a part thereof, the lower deck member 70 and the intermediate deck member 54 defining a middle compartment 74 therebetween. Formed in the deck member 70 and its overlying carpet 72, is an opening 76 that is offset relative to the opening 57 formed in the lower deck member 54 and that provides access from the middle compartment 74 to an upper compartment as will be described.

Again referring to FIGS. 6 and 7, the panels 14 and 18 are formed with upper horizontal slots 78 and 80, respectively, which receive therein a plurality of upper support beams 82 which extend across the housing interior in transverse relation with respect to the intermediate support beams 64 and beyond the panels 14 and 18 so as to be externally visible. Formed in the exposed ends of the support beams 80 are small circular recesses in which upstanding pegs 84 are retained in frictional engagement for locking the support beams 82 within the slots 78 and 80 against withdrawal movement thereof. Mounted on the upper support beams 82 is a deck member 86 on which a carpet member 88 is located that is foreshortened, the purpose of which will hereinafter be described. As shown in FIG. 2, the upper deck member 86 cooperates with the intermediate deck member 70 to define an upper compartment 90; and formed in the upper deck member 86 and its carpet overlay is an opening 89 (FIG. 1) that is offset relative to the opening 76 formed in the intermediate deck member 70 and that provides access between the upper compartment 90 and the top of the playhouse.

In order to lock the various panels in the erected position thereof as shown in FIG. 1, a unique upper flap assembly is formed at the uppermost end of each of the housing panels. In this connection, and referring to FIG. 6, the panel 12 is shown formed with a flap assembly generally indicated at 92 that includes a lower section 94 that is joined to the uppermost end of the panel 12 along a fold line 96. Joined to the lower section 96 along a fold line 98 is a first intermediate section 100. Connected to the first intermediate section 100 along a fold line 102 is a second intermediate section 104, while an outer section 106 is joined to the second intermediate section 102 along a fold line 108. The sections 100, 104, and 106 extend substantially the full width of the panel 12 to provide for a more secure locking of the individual flap assemblies when they are folded to the locking position thereof as will be described. As further shown in FIG. 6, the panel 14 is shown including an upper flap assembly generally indicated at 110 that is formed similarly to the flap assembly 92 and includes a lower section 112 joined to a first intermediate section 114 along a fold line 116. The first intermediate section 114 is joined to a second intermediate section 118 along a fold line 120 while an outer section 122 is joined to the second intermediate section 118 through a fold line 124. As illustrated in FIG. 6, the sections 114, 118 and 122 are all foreshortened with respect to the width of the panel 14 and cooperate with the sections 100, 104 and 106 of the panel 12 to form a positive locking engagement therewith along the sides thereof.

Referring now to FIG. 7, the panel 16 is shown having a flap assembly generally indicated at 126 that is similar in construction to the flap assembly 92 and includes a lower section 128 that is joined to the uppermost edge of the panel 16 by a fold line 130. A first intermediate section 132 is joined to the section 128 by means of a fold line 134 while a second intermediate section 136 is joined to the first intermediate section 132 by a fold line 138. Finally, an outer section 140 is joined to the second intermediate section through a fold line 142. Again, the flap assembly 92 of the panel 16 extends the full width of the panel as illustrated in FIG. 7 for providing a more secure locking arrangement in the erected position of the panels.

As further illustrated in FIG. 7, the panel 18 is formed with an upper flap assembly generally indicated at 144 that includes a lower section 146 connected to the uppermost edge of the panel 18 by a fold line 148. Joined to the lower section 146 along a fold line 150 is a first intermediate section 152, while joined to the first intermediate section 152 along a fold line 154 is a second intermediate section 156. Finally, an outer section 158 is joined to the second intermediate section 156 along a fold line 160. The sections of the panel assembly 144 are also foreshortened relative to the panel 18 and cooperate with the sections of the adjacent panel assemblies to form a secure locking arrangement.

As will be described, each of the flap assemblies are folded in the same manner to form an upper rampart segment, all of the upper rampart segments cooperating with the top deck member 86 to firmly secure the housing panels in a fixed and rigid position.

Figure 3:
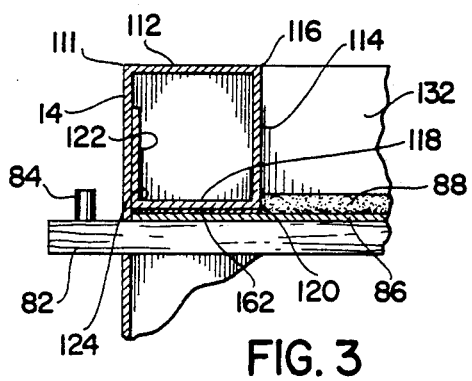
FIG. 3 is a sectional view of a corner of the playhouse taken along lines 3—3 in FIG. 1.

Referring now to FIGS. 2 and 3, the flap assembly 110 as fixed to the uppermost end of the panel 14 is illustrated and is representative of the manner in which all of the flap assemblies are secured in place. As shown, the lowermost section 112 forms an upper horizontal surface that forms one part of the uppermost perimeter that defines the ramparts that extend around the top of the housing. The first intermediate section 114, which is joined to the section 112 along the fold line 116 is now located in a vertical position in spaced parallel relation with respect to the uppermost end of the panel 14. The section 118 which is joined to the section 114 along the fold line 120 is disposed in spaced, horizontal parallel position with respect to the section 112, while the section 122 that is joined to the section 118 along the fold line 124 is located in a vertical position in abutting and supporting relation with respect to the interior of the panel 14. As further illustrated in FIG. 3, the underside of the flap 118 as shown therein is provided with an adhesive material 162 that may be applied thereto in the securement of the flap assembly 110 to the deck member 86. However, preferably the adhesive 162 is part of a double-sided adhesive strip, one side of the strip being secured to the section 118, and the other side being stripped during the erecting of the housing to expose the adhesive surface for securement of the bottom of the section 118 to the upper surface of the adjacent deck member 86. As previously described, the carpeting 88 applied over the deck member 86 has been foreshortened, and it is seen that the flap assembly 110 is located such that the carpeting 88 abuts against the section 114 while the section 118 is secured directly to the exposed upper surface of the deck member 86. The other flap assemblies, namely, the flap assemblies 92, 126 and 144 are all folded in the same manner as just described to form a plurality of rigid upper rampart segments as illustrated in FIG. 1 that cooperate with the deck member 86 to fix the flap assemblies in place and to provide a rigid construction with the other deck members as mounted on their respective support beams.

As also illustrated in FIG. 1, an elongated post 164 having a decorative flag 166 or similar ornament secured thereto is mounted in an opening formed in the topmost end of the deck member 86 and the carpeting 88 located thereon, and engages the uppermost surface of the carpeting 72 as located on the intermediate deck member 70. The post 164 and the flag 166 cooperate with the openings and slots as formed in the housing panels to provide a castle-like tower appearance for the playhouse. It is also seen that the openings in the panel walls, the slots as formed therein and the exposure of the ends of the support beams exteriorly of the housing all cooperate to impart a castle-like appearance to the housing.

In use, a cat can enter the playhouse through any of the openings 32, 34 or 36, and upon entering the playhouse through the opening 32 or one of the other openings, the cat has access to the various compartments 58, 74 and 90 through the interior access openings 57 and 76. The access opening 89 as formed in the upper deck member 86 also enables the cat to reach the top of the housing which adds further play value to the playhouse. The vertical slots 38, 40, 42, and 44 as described provide exterior visibility for the cat from the intermediate and upper compartments of the housing which also adds interest to the cat as it moves from one level to another in the housing.

When it is desired to locate the playhouse housing in the closed position thereof, the upper rampart segments as defined by the various flap assemblies are removed from their folded positions and the deck members and support beams therefor are sequentially removed beginning with the top deck member 86. In order to remove the various support beams, the pegs 52 are lifted from their recesses in the corresponding exposed ends of the beams which allows the support beams to be slidably moved out of the horizontal slots in which they are located. When all of the deck members and support beams have been removed from the assembly, and with the flap assemblies in the open position, as shown in FIGS. 6 and 7, the housing is ready for folding and collapsing to the closed position thereof. In this connection, reference is now made to FIGS. 8-10. The opposing panels are shown in the open position in FIG. 8, while in FIG. 9 the panels 14 and 18 have been partially collapsed inwardly along the medial fold lines 28 and 30 so as to define the panel segments 14a, 14b, and 18a, 18b. Finally, in FIG. 10, the panels have been moved to their fully collapsed position which now enables the collapsed and folded playhouse to be conveniently packaged or stored in a relatively small area or container.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A playhouse for cats, comprising a collapsible housing having a plurality of vertical panels that are formed in a one-piece construction and that are movable relative to each other to a closed, collapsed position whereby the housing is conveniently stored or shipped, a plurality of interior horizontal deck members located within said housing and being disposed in vertically, spaced relation to define a plurality of spaced interior compartments therein, said deck members including an upper member that forms the top of the housing, means for supporting said deck members within the housing, an opening formed in at least one of said vertical panels which communicates with an interior compartment to provide access for a cat thereto, and means for locking said vertical panels in the open erected position, said locking means including locking flap assemblies that are joined to said vertical panels at the uppermost ends thereof and that are foldable to a locked position to define horizontal upper perimeter rampart segments that cooperate with the upper deck member to secure the vertical panels in a stable, erected position.

2. A playhouse for cats as claimed in claim 1, said supporting means for said deck members including a plurality of support beams that are disposed in a spaced apart horizontal position and that are fixed in opposed vertical panels of said housing, said deck members and support beams cooperating with said locking means to firmly secure the panels in the erected open position.

3. A playhouse for cats as claimed in claim 2, each of said panels having slots formed therein through which a support beam extends for locating said support beams in the horizontal position thereof, each end of said support beams extending through a slot and being exposed on the exterior side of said panels, and means for securing said support beams in said slots.

4. A playhouse for cats as claimed in claim 3, each of said support beams having a recess formed in the end thereof that extends through a slot in said panels, and said securing means including a removable upstanding peg that is received in a recess in the ends of said support beams to prevent removal of the support beams from said slots.

5. A play as claimed in claim 3, each of said slots as formed in said vertical panels being aligned with a corresponding slot in an oppositely located parallel vertical panel wherein said beam members are disposed in flat horizontal position as received in their respective slots.

6. A playhouse as claimed in claim 5, said deck members being defined by flat members that have a configuration that corresponds to the cross-sectional configuration of the erected housing.

7. A playhouse as claimed in claim 6, the slots for receiving said beam members therein being located in alternate relation in the opposed vertical panels, so that the ends of said beam members as they extend through the opposed panels are externally visible in all of said vertical panels.

8. A playhouse for cats as claimed in claim 1, each of said locking flap assemblies that lock said vertical panels in the erected position thereof including a series of foldable horizontal sections that when folded define a box-like configuration in cross-section, one of said sections in each flap assembly being disposed in a horizontal position, the underside of which is secured to the adjacent uppermost deck member to lock the vertical panels in the erected position.

9. A playhouse for cats as claimed in claim 8, each of said flap assemblies including a panel that in the folded position of its flap assembly is disposed in face-to-face relation with an upstanding portion of the adjacent vertical panel and cooperating with the upstanding portion to support the flap assembly in the box-like configuration thereof.

10. A playhouse as claimed in claim 1, each of said deck members having a carpeting material located in overlying relation thereon to add interest for a cat playing in the playhouse.

11. A playhouse as claimed in claim 10, each of the deck members having an access opening formed therein that provide communication between said compartments for the cat playing in the playhouse.

12. A playhouse for cats as claimed in claim 1, two of said vertical panels having fold lines located medially thereof and extending in a vertical direction, the vertical fold lines providing for the collapsing of the panels in which they are formed so as to dispose all of said panels in a collapsed, folded position when the panels are moved to the closed position thereof.

13. A playhouse for cats as claimed in claim 1, the uppermost of said deck members having an opening formed therein for receiving a post that extends upwardly thereabove for display above said housing.

14. A playhouse for cats, comprising a collapsible housing having a plurality of vertical panels that are formed in a one-piece construction and that are movable relative to each other to a closed collapsed position, whereby the housing is stored or shipped, means for locking said vertical panels in the open erected position, a plurality of interior horizontal deck members located within said housing and being disposed in vertically spaced relation to define a plurality of spaced interior compartments therein, an opening formed in at least one of said vertical panels which provides communication with an interior compartment to provide access for a cat thereto, and means for supporting said deck members within said housing, said supporting means for said deck members including a plurality of support beams that are disposed in a spaced apart horizontal position and that are fixed in opposed vertical panels of said housing, each of said panels having slots formed therein through which a support beam extends for locating said support beams in the horizontal position thereof, each end of said support beams extending through a slot in a corresponding panel and being exposed on the exterior side thereof, each of said slots as formed in said vertical panels being aligned with a corresponding slot in an oppositely located parallel vertical panel, wherein said support beams are disposed in flat horizontal position as received in their respective slots, and means for securing said support beams in said slots, said deck members and support beams cooperating with said locking means to firmly secure the panels in the erected open position thereof.

15. A playhouse for cats as claimed in claim 14, each of said support beams having a recess formed in the end thereof that extends through a slot in said panels, and said securing means including a removable upstanding peg that is received in a recess in the ends of said support beams to prevent removal of the support beams from said slots.

16. A playhouse as claimed in claim 14, said deck members being defined by flat members that have a configuration that corresponds to the cross-sectional configuration of the erected housing.

17. A playhouse as claimed in claim 16, the slots for receiving said beam members therein being located in alternate relation in the opposed vertical panels, so that the ends of said beam members as they extend through the opposed panels are externally visible in all of said vertical panels.

* * * * *